No. 879,727. PATENTED FEB. 18, 1908.
G. W. BROWN.
HEADLIGHT.
APPLICATION FILED AUG. 28, 1907.
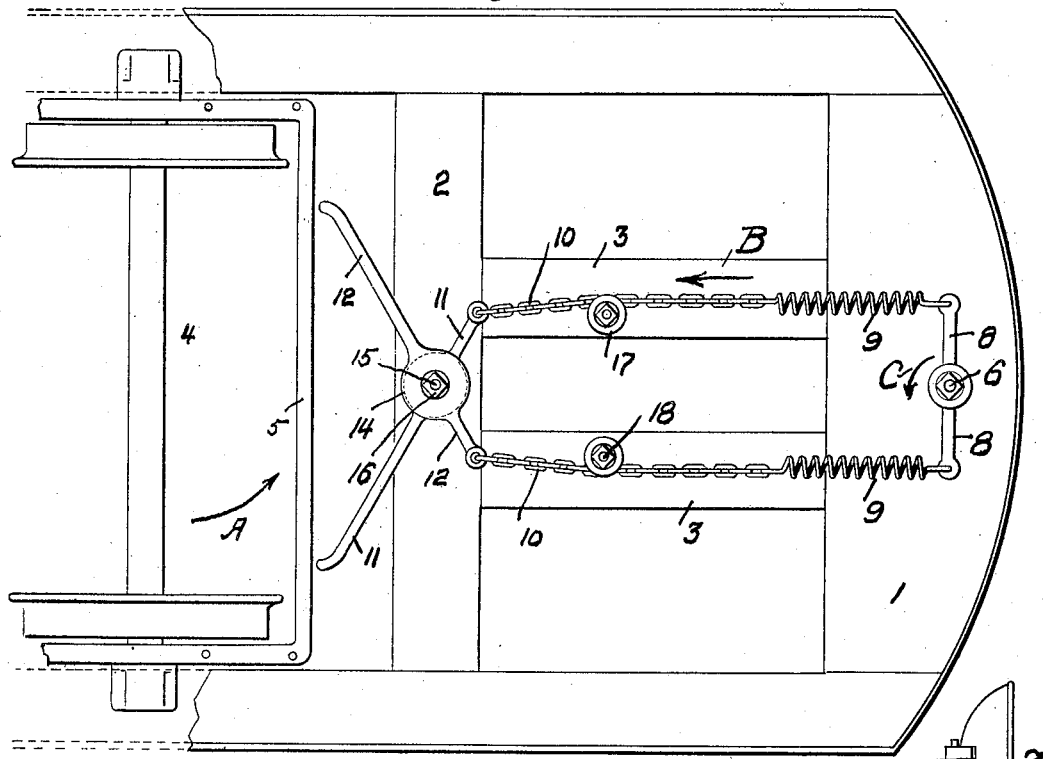
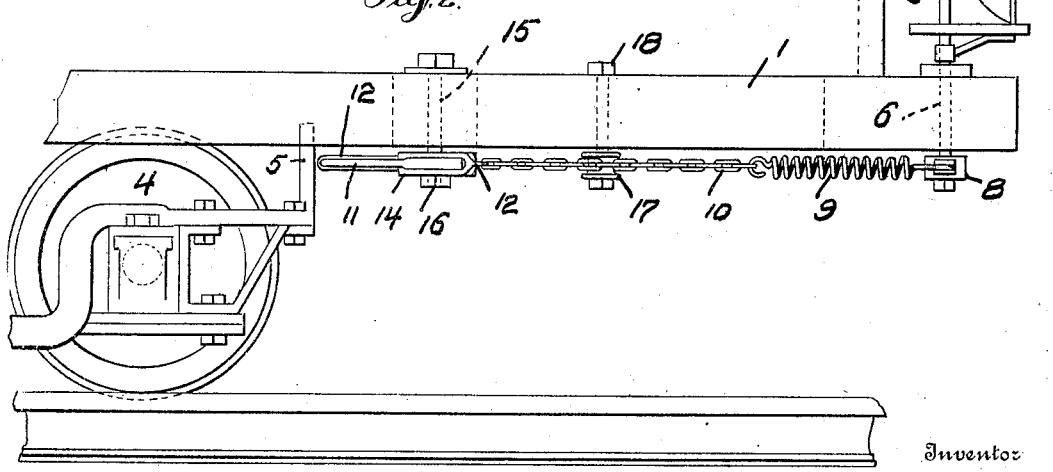
Witnesses
Samuel Payne
Inventor
G. W. Brown.
By
Attorneys

UNITED STATES PATENT OFFICE.

GEORGE W. BROWN, OF LEXINGTON, KENTUCKY.

HEADLIGHT.

No. 879,727.   Specification of Letters Patent.   Patented Feb. 18, 1908.

Application filed August 28, 1907. Serial No. 390,469.

*To all whom it may concern:*

Be it known that I, GEORGE W. BROWN, a citizen of the United States of America, residing at Lexington, in the county of Fayette and State of Kentucky, have invented certain new and useful Improvements in Headlights, of which the following is a specification, reference being had therein to the accompanying drawing.

This invention relates to improvements in headlights, and the invention has for its object the provision of novel means for automatically moving the headlight of a locomotive or car, whereby the rays of said light will at all times be directed upon the track over which the locomotive or car travels.

It is a well known fact that headlights are stationarily held upon a locomotive or car, and that when a locomotive or car is passing around a curve, the light from the headlight is cast in a different direction from that which the trucks of the locomotive or car are traveling, thus leaving the curved track in front of the locomotive or car in darkness and preventing an engineer or motorman from observing any obstacles upon the track.

My invention aims to provide automatic means for turning the headlight of a locomotive or car, as the trucks of the locomotive or car pass around a curve, in other words, maintaining the headlight at all times parallel with the trucks of the locomotive or car.

The device by which I accomplish this result is extremely simple, strong and durable, and the detail construction entering into the same will be presently described.

In the drawing, Figure 1 is a bottom plan of a portion of a car equipped with my improved device, Fig. 2 is an elevation of the same.

As illustrated the device is applied to a street car, the reference numeral 1 designating the front platform of a car, 2 a girder, 3 connecting beams, and 4 one of the trucks of the car, said truck having a transverse brace or connecting rod 5, which is adapted to actuate my device.

I provide the platform 1 with a vertically disposed revoluble shaft 6, the upper end of which carries the usual form of headlight 7. The lower end of the shaft 6 below the platform 1 is provided with a cross head 8, and connected to said cross head are coil springs 9; these springs are in turn connected by chains 10 with actuating arms 11 and 12.

The arm 12 is enlarged, as at 14, to provide a bearing for the arm 11, and these arms are pivotally connected to the girder 2 by a king bolt 15 and a nut 16. The arms 11 and 12 extend in close proximity to the connecting rod 5, whereby as the truck turns in following the rails of a track, either of said arms will be actuated. In order to guide the chains 10 and prevent their displacement, I journal grooved pulleys or sheaves 17 upon the beams 3, bolts and nuts 18 being used for this purpose.

In order that my invention can be fully understood, I will assume that the truck 4 is traveling in the direction of the arrow A. As the truck swings, it strikes the arm 11, pulling rearwardly upon the chain 10 and the spring 9 as indicated by the arrow B. The shaft 6 will then be swung in the direction of the arrow C, and the headlight 7 will cast its rays in the direction which the truck 4 is traveling, irrespective of the position the car body might assume.

By certain modifications my invention is applicable to locomotives and similar vehicles, therefore I do not care to confine myself to the specific aggregation of the structural elements of my invention.

Having now described my invention what I claim as new, is:—

1. In combination with a car truck having a transversely-extending brace, and a car platform, a vertical shaft journaled in the platform, a cross-head carried by the lower end of said shaft, and a head light carried by the shaft above the platform, chains connected at one end to the ends of the cross-head, a king-bolt journaled in the platform, and two actuating arms mounted on said king-bolt for independent movement having their outer ends connected to said chains and their inner ends lying in close proximity to said transverse brace on the car truck to be engaged thereby for actuating the headlight.

2. In combination with a car having a platform and having a rigid actuating member at the rear of the platform, of a vertical shaft journaled in the platform at the forward end thereof, a head light carried by said shaft, a cross-head on the lower end of the shaft, a king-bolt journaled in the platform, two actuating arms mounted on said king-bolt for independent movement, one of said arms having a bearing at its pivotal point receiving the other arm therein, the said arms having their rear ends extending in close proximity to said rigid actuating member, and connections between the outer ends of said arms and the cross-head on said vertical shaft, whereby when either of said arms is engaged by said actuating member, the vertical shaft will be turned.

In testimony whereof I affix my signature in the presence of two witnesses.

GEORGE W. BROWN.

Witnesses:
T. D. MURRAY,
R. B. CARTER.